United States Patent
McNally et al.

(12) 
(10) Patent No.: US 6,259,448 B1
(45) Date of Patent: Jul. 10, 2001

(54) RESOURCE MODEL CONFIGURATION AND DEPLOYMENT IN A DISTRIBUTED COMPUTER NETWORK

(75) Inventors: Michael McNally; Brian Jay Vetter, both of Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/089,964

(22) Filed: Jun. 3, 1998

(51) Int. Cl.[7] .............................. G06F 3/00; G06F 15/177
(52) U.S. Cl. .................... 345/348; 345/329; 345/339; 345/969; 709/201; 709/223
(58) Field of Search .................................. 345/329, 335, 345/339, 348, 356, 969; 395/200.31, 200.33, 200.35, 200.53, 200.54; 709/201, 203, 205, 223, 224

(56) References Cited

U.S. PATENT DOCUMENTS

| | | | |
|---|---|---|---|
| 5,157,667 | 10/1992 | Carusone, Jr. et al. | 371/29.1 |
| 5,353,401 | 10/1994 | Iizawa et al. | 395/161 |
| 5,394,522 | * 2/1995 | Sanchez-Frank et al. | 709/223 X |
| 5,414,644 | 5/1995 | Seaman et al. | 364/551.01 |
| 5,475,851 | 12/1995 | Kodosky et al. | 395/800 |
| 5,481,741 | 1/1996 | McKaskle et al. | 395/800 |
| 5,495,567 | 2/1996 | Iizawa et al. | 395/161 |
| 5,504,921 | * 4/1996 | Dev et al. | 709/223 |
| 5,539,869 | 7/1996 | Spoto et al. | 395/336 |
| 5,555,370 | 9/1996 | Li et al. | 395/161 |
| 5,557,731 | 9/1996 | Li et al. | 395/161 |
| 5,604,907 | 2/1997 | Conner et al. | 395/683 |
| 5,623,657 | 4/1997 | Conner et al. | 395/683 |
| 5,625,823 | 4/1997 | Debenedictis et al. | 395/706 |
| 5,634,095 | 5/1997 | Wang et al. | 395/326 |
| 5,742,286 | * 4/1998 | Kung et al. | 345/329 X |
| 5,758,083 | * 5/1998 | Singh et al. | 709/223 |
| 5,764,908 | * 6/1998 | Shoji et al. | 709/203 X |
| 5,862,325 | * 1/1999 | Reed et al. | 709/201 |

OTHER PUBLICATIONS

Njal Pettit et al., "A Graphical Analysis Method for Piecewise Linear Systems," IEEE, p. 1122–1127, 1994.*
Jian Xu et al., "A Simulated Annealing Method for Mapping Production Systems onto Multicomputers," IEEE, p. 130–136, 1990.*
IBM Technical Disclosure Bulletin, "Graphical Network Analyzer," Dec. 1993, vol. 36, No. 12, (pp. 473–480).
IBM Technical Disclosure Bulletin, "Object Model for a Graphic Network Topology Interface," Oct. 1995, vol. 38, No. 10, (pp. 369–370).
IBM Technical Disclosure Bulletin, "Graphical User Interface for the Distributed Computing Environment," Jan. 1995, vol. 38, No. 1, (pp. 409–410).
IBM Technical Disclosure Bulletin, "Combining Multiple Layers of Configuration Models into a Single Report," Mar. 1994, vol. 37, No. 3 (pp. 557–560).

* cited by examiner

Primary Examiner—Raymond J. Bayerl
Assistant Examiner—X. L. Bautista
(74) Attorney, Agent, or Firm—Duke W. Yee; Jeffrey S. LaBaw

(57) ABSTRACT

A method of deploying a "resource model" in a distributed computer network using a computer having graphical user interface (GUI). The resource model has a number of properties associated therewith including a set of mapping rules. To deploy the resource model, an icon representing the resource model is displayed on the interface, together with a set of distribution icons. Each distribution icon, for example, represents a set of given machines in the distributed computer network. The icon representing the resource model is then associated with a selected one of the distributed icons, preferably via a drag-and-drop protocol. When the resource model icon is dropped onto the selected distribution icon, the resource model is deployed in the network by instantiating its mapping rules at each machine in the set.

20 Claims, 6 Drawing Sheets

RESOURCE MODEL CONFIGURATION AND DEPLOYMENT IN A DISTRIBUTED COMPUTER NETWORK

BACKGROUND OF THE INVENTION

1. Technical Field

The present invention is directed to a user interface for configuring and deploying resource "models" in a large distributed computer enterprise environment.

2. Description of the Related Art

Enterprises now desire to place all of their computing resources on a computer network. To this end, it is known to connect computers in a large, geographically-dispersed network environment and to manage such an environment in a distributed manner. One such management framework consists of a server that manages a number of nodes, each of which has a local object database that stores object data specific to the local node. Each managed node typically includes a management framework, comprising a number of management routines, that is capable of a relatively large number (e.g., hundreds) of simultaneous network connections to remote machines. The framework manages hundreds of megabytes of local storage and can spawn many dozens of simultaneous processes to handle method requests from local or remote users. This amount of power, however, is quite costly. Each managed node requires upwards of a megabyte of local memory of disk plus a permanent TCP/IP connection. If a managed node sees heavy use, then such costs go up considerably. Moreover, as the number of managed nodes increases, the system maintenance problems also increase, as do the odds of a machine failure or other fault.

The problem is exacerbated in a typical enterprise as the node number rises. Of these nodes, only a small percentage are file servers, name servers, database servers, or anything but end-of-wire or "endpoint" machines. The majority of the network machines are simple personal computers ("PC's") or workstations that see little management activity during a normal day. Nevertheless, the management routines on these machines are constantly poised, ready to handle dozens of simultaneous method invocations from dozens of widespread locations, invocations that rarely occur.

When networks get very large, individual machines tend to lose their identity. Nevertheless, machines of certain classes share certain problems. To manage such distributed systems, it has been proposed to "abstract" a given "resource" in the distributed network into a so-called "model" to facilitate administration. Examples of distributed system resources include computer and communications hardware, operating system software, application programs, systems of programs cooperating to provide a service, and the like. Managing resource models (as opposed to specific resources) provides significant advantages. Thus, for example, by enabling an administrator to characterize the type or class of machine that should receive a particular task, resource model-based management obviates naming a vast host of machines explicitly or the distribution of tasks to all machines within a domain.

Although resource model-based management is desirable, there remains a need to provide techniques to facilitate building and deployment of resource models within a distributed computing environment. This is the problem solved by the present invention.

BRIEF SUMMARY OF THE INVENTION

It is a primary object of this invention to simplify configuration and deployment of resource models within a large, distributed computer network.

It is another primary object of this invention to build and deploy a given resource model into a distributed computer network environment preferably using a drag-and-drop protocol on a graphical user interface (GUI) of a computer.

It is yet another object of this invention to simplify the method by which a given resource model is associated with a given set of machines in a large distributed computer enterprise environment.

Yet another more general object of this invention is to simplify distributed computing network management.

A still further object of the invention is to implement a drag-and-drop protocol in a user interface of a management computer to instantiate a set of resource mapping rules on each of a set of given machines in the environment.

A more general object of this invention is to use a "drag-and-drop" protocol on a computer GUI to build and/or deploy predefined task objects or task group objects within a distributed computer network.

A still further object of this invention is to deploy predefined task objects to a number of locations in a network with a minimum of actions required by the administrator.

These and other object of the invention are provided in a method of deploying a resource model in a distributed computer network using a computer having a graphical user interface. The resource model generally has a number of properties associated therewith: a current state, a set of state rules, a set of controls, and a set of mapping rules. The state of the model describes the modeled resource by an attribute set. State rules define how changes to state attributes signify state changes of the modeled resource. Controls enable a user, through an appropriate user interface, to interact with and control the underlying resource to be manipulated. Mapping rules determine how a model is connected to an actual resource. Typically, mapping rules operate on a set of node identifiers defining a portion of the managed network (e.g., a geographic region) over which the model is to be deployed. The state rules and the controls comprise an "automation" that is deployed to a particular node in the network and is executable in a runtime environment resident there.

The present invention describes a method to deploy the resource model, which includes the automation. The method begins by having an administrator open up a deployment task window on the GUI. Using conventional menus and other conventional GUI components, the administrator selects a resource model and a set of distribution icons. Each distribution icon corresponds to a set of machines, for example. Alternatively, a particular set of machines may be "discovered" by the system with the distribution icon then being associated therewith. The icon representing the resource model, together with the set of distribution icons, are then displayed on the GUI. In a representative case, each distribution icon represents a set of given machines in the distributed computer network, e.g., machines located in one geographic area of the distributed enterprise environment.

The icon representing the resource model is then associated with a selected one of the distributed icons, preferably via a drag-and-drop protocol. When the resource model icon is dropped onto the selected distribution icon, the resource model is deployed in the network. Typically, deployment includes instantiating the resource model mapping rules at each machine in the set without further administrator or local machine involvement. One preferred technique for instantiating the resource model mapping rules uses the runtime environment at each receiving node.

According to a feature of the invention, a discovery process is implemented to discover at least one set of machines having a particular resource associated therewith. A distribution icon associated with the discovered set is then displayed. A given resource model is then instantiated on the discovered set of machines by dropping-and-dragging an icon representing the resource model onto the distribution icon. In response to this operation, the resource model is instantiated onto the set of machines.

The method is preferably implemented in a computer for use in managing the large distributed computer enterprise environment. The computer includes a processor, an operating system, a graphical user interface, and a data storage system for storing network configuration data for use in managing the distributed computer environment. The computer also includes a resource model deployment means comprising a number of functional components: a first program or routine for discovering at least one set of machines having a resource associated therewith, a second program or routine for associating the discovered set of machines with a distribution icon displayed on the interface, and a third program or routine responsive to dragging and dropping an icon representing a resource model onto the distribution icon for directing instantiation of the resource model onto the set of machines. The resource model is instantiated on a given machine in the set using a runtime environment supported on the machine as a local resource.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
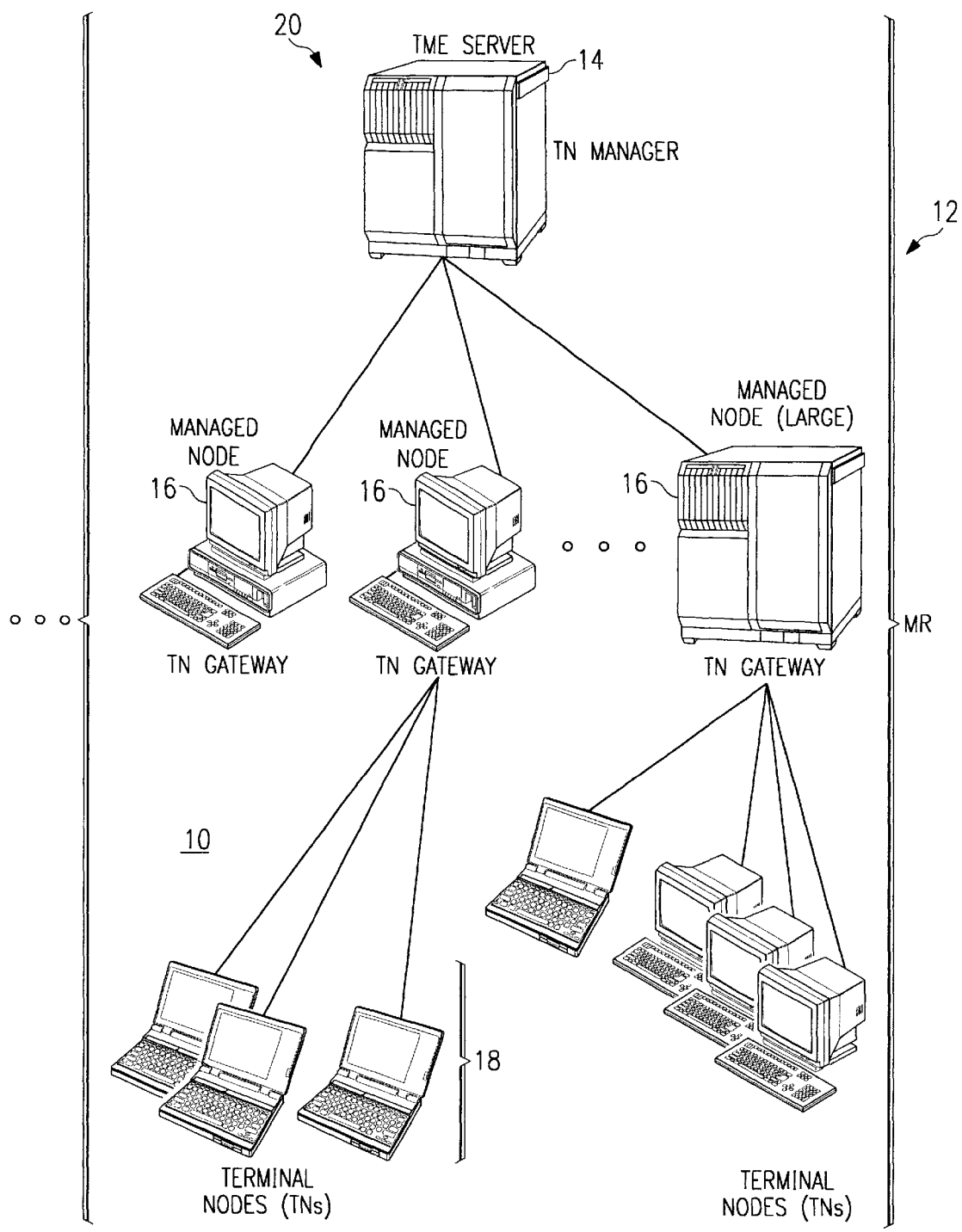
FIG. 1 illustrates a simplified diagram showing a large distributed computing enterprise environment in which the present invention is implemented.

Referring now to FIG. 1, the invention is preferably implemented in a large distributed computer environment 10 comprising up to thousands of "nodes." The nodes will typically be geographically dispersed and the overall environment is "managed" in a distributed manner. Preferably, the managed environment (ME) is logically broken down into a series of loosely-connected managed regions (MR) 12, each with its own management server 14 for managing local resources with the MR. The network typically will include other servers (not shown) for carrying out other distributed network functions. These include name servers, security servers, file servers, threads servers, time servers and the like. Multiple servers 14 coordinate activities across the enterprise and permit remote site management and operation. Each server 14 serves a number of gateway machines 16, each of which in turn support a plurality of endpoints 18. The server 14 coordinates all activity within the MR using a terminal node manager 20.

Figure 2:
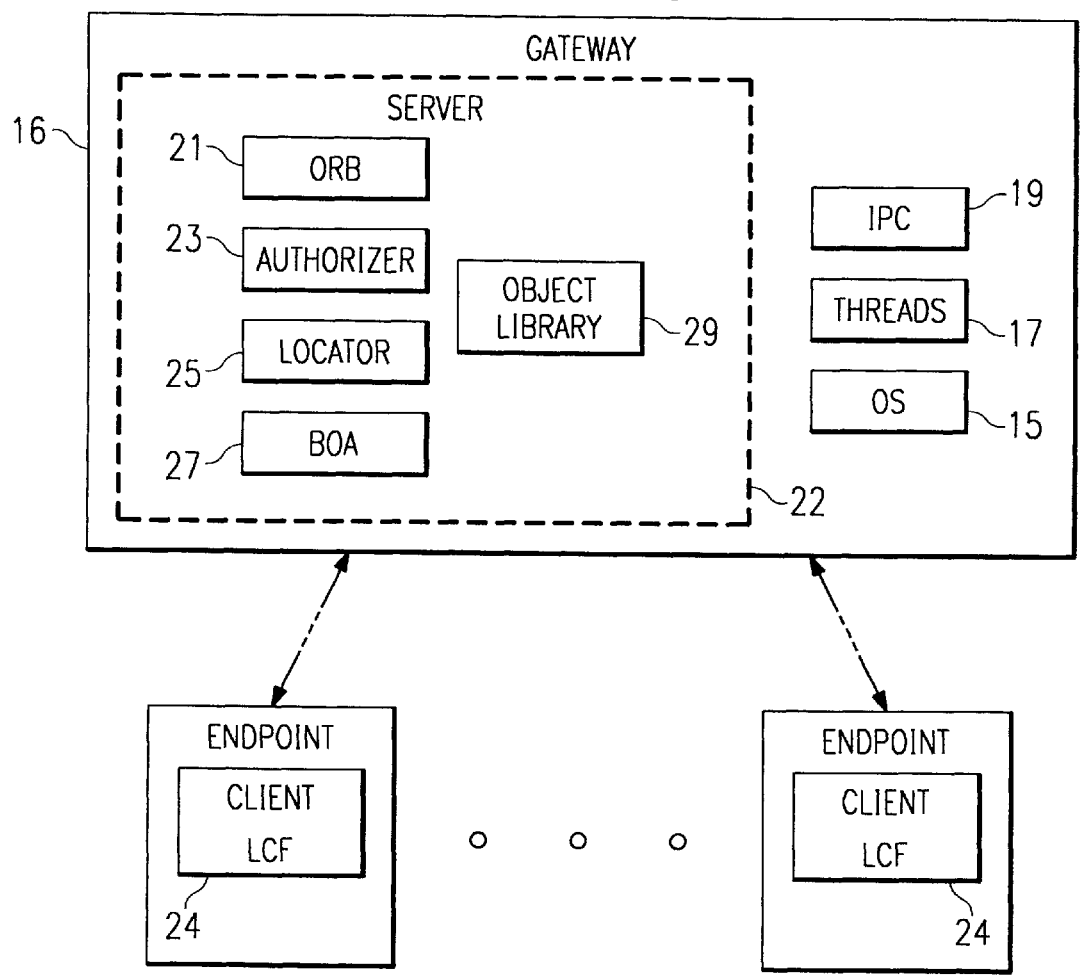
FIG. 2 is a block diagram of a preferred system management framework illustrating how the framework functionality is distributed across the gateway and its endpoints within a managed region.

Referring now to FIG. 2, each gateway machine 16 runs a server component 22 of a system management framework. The server component 22 is a multi-threaded runtime process that comprises several components: an object request broker or "ORB" 21, an authorization service 23, object location service 25 and basic object adaptor or "BOA" 27. Server component 22 also includes an object library 29. Preferably, the ORB 21 runs continuously, separate from the operating system, and it communicates with both server and client processes through separate stubs and skeletons via an interprocess communication (IPC) facility 19. In particular, a secure remote procedure call (RPC) is used to invoke operations on remote objects. Gateway machine 16 also includes an operating system 15 and a threads mechanism 17.

The system management framework includes a client component 24 supported on each of the endpoint machines 18. 10 The client component 24 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like.

Figure 3:
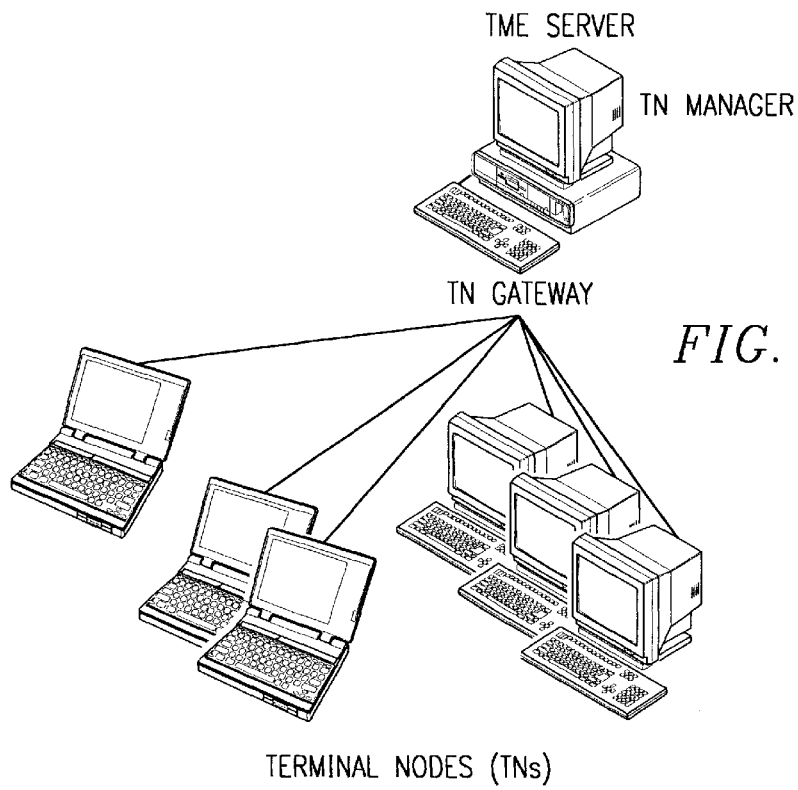
FIG. 3 illustrates a smaller "workgroup" implementation of the enterprise in which the server and gateway functions are supported on the same machine.

In the large enterprise such as illustrated in FIG. 1, preferably there is one server per MR with some number of gateways. For a workgroup-size installation (e.g., a local area network) such as illustrated in FIG. 3, a single server-class machine may be used as the server and gateway, and the client machines would run a low maintenance framework References herein to a distinct server and one or more gateway(s) should thus not be taken by way of limitation as these elements may be combined into a single platform. For intermediate size installations the MR grows breadth-wise, with additional gateways then being used to balance the load of the endpoints.

The server is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoint and gateway, and this mapping is preferably dynamic.

As noted above, there are one or more gateways per managed region. Preferably, a gateway is a fully-managed node that has been configured to operate as a gateway. As endpoints login, the gateway builds an endpoint list for its endpoints. The gateway's duties preferably include: listening for endpoint login requests, listening for endpoint upcall requests, and (its main task) acting as a gateway for method invocations on endpoints.

Figure 2A:
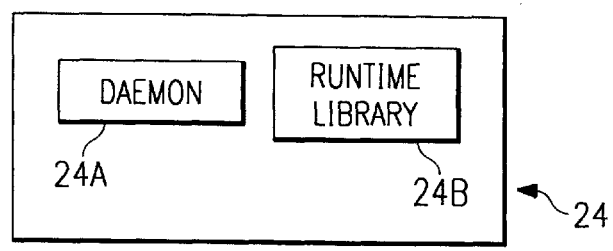
FIG. 2A is a block diagram of the elements that comprise the LCF client component of the system management framework.

As also discussed above, the endpoint is a machine running the system management framework client component, which is referred to herein as the low cost framework (LCF). The LCF has two main parts as illustrated in FIG. 2A: the LCF daemon 24a and an application runtime library 24b. Together, these components comprise a runtime environment. The LCF daemon 24a is responsible for endpoint login and for spawning application endpoint executables. Once an executable is spawned, the LCF daemon 24a has no further interaction with it. Each executable is linked with the application runtime library 24b, which handles all further communication with the gateway.

Preferably, the server and each of the gateways is a computer or "machine" having a windows-based graphical user interface of "GUI"). For example, each computer may be a RISC System/6000® (a reduced instruction set or so-called RISC-based workstation) running the AIX (Advanced Interactive Executive) operating system, preferably Version 3.2.5 or greater. Suitable alternative machines include: an IBM-compatible PC x86 or higher running Novell UnixWare 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3. Of course, other machines and/or operating systems may be used as well for the gateway and server machines.

Each endpoint is also a computer. In one preferred embodiment of the invention, most of the endpoints are personal computers (e.g., desktop machines or laptops). In this architecture, the endpoints need not be high powered or complex machines or workstations. One or more of the endpoints may be a notebook computer, e.g., the IBM ThinkPad® machine, or some other Intel x86 or Pentium®-based computer running Windows '95 or greater operating system. IBM® or IBM-compatible machines running under the OS/2®operating system may also be implemented as the endpoints. An endpoint computer preferably includes a browser, such as Netscape Navigator or Microsoft Internet Explorer, and may be connected to a gateway via the Internet, an intranet or some other computer network. The browser typically includes a Java Virtual Machine (JVM), which provides a convenient runtime environment for programs written as Java applications or applets.

In the present invention, interactions with distributed system "resources" are effected using so-called "models". A model also serves to describe how a resource is observed and managed. In general, a resource is a component or element within the distributed system that is manageable or that needs to be managed. Examples of resources are quite diverse and include, among others, machines, computer and communications hardware, operating system software, application programs, file systems, machine processes, system interfaces, and systems of programs cooperating to provide a service. Any manageable component, element, process, interface or device within the distributed system may be considered a "resource."

A resource that cannot be decomposed into other manageable components is sometimes called a primitive resource. A resource that can be decomposed into other manageable components is a composite resource. Thus, for example, one primitive resource is a single file system on a file server. An example of a composite resource is the file server system as a whole. A composite resource may be built from a set of one or more primitive resources.

Figure 4:
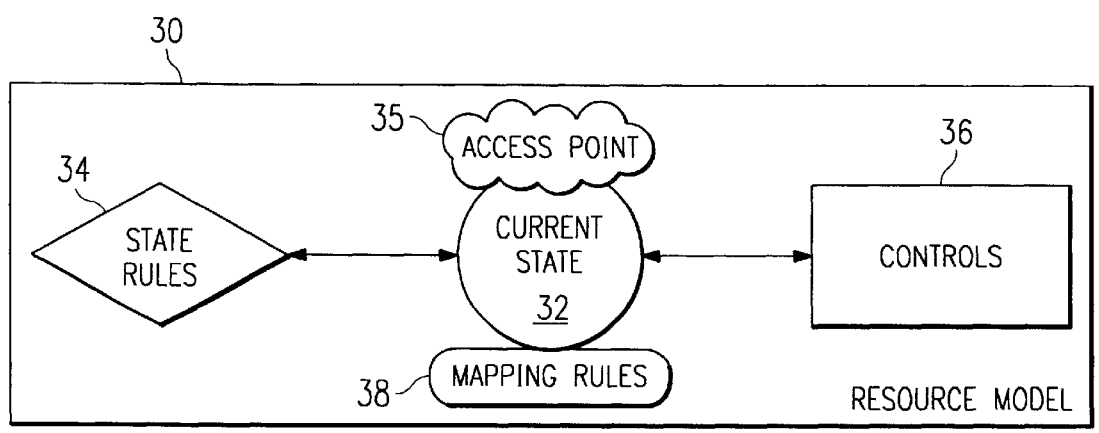
FIG. 4 is a block diagram of a resource model that is managed according to the present invention.

The present invention provides a tool to facilitate management of "resources" present in a large distributed network of computers using "resource models." As seen in FIG. 4, a resource model 30 preferably has the following properties: a current state 32, a set of state rules 34, a set of controls 36, and a set of mapping rules 38. The "state" 32 of a model describes the modeled resource by an arbitrary set of attributes capturing all aspects of the resource necessary to manage it. Models for primitive resources, for example, might have a very concise state, while a composite resource may have a complex state involving many separate attributes. Conceptually, the state 32 represents everything an administrator needs to know about a resource to determine its operability and to manage the resource. Many of the attributes that comprise the state of a composite resource model come directly from the state of more primitive component models. Others are derivatives of component states.

As a concrete example, assume the resource model is a model for a disk partition. The attributes for such a model might then be the amount of free space in the partition, the number of bad blocks in the partition, the number of files within the partition, and the like. Of course, these attributes are merely representative. A more complex or "composite" resource model would be a model of a database server. The state of the composite model would then depend on the state of the more primitive components, like the disk drive or a drive partition, a central processor, and the like.

State rules 34 preferably define how changes to state attributes signify significant changes in state 32 of the modeled resource. A state rule 34 is a predicate function over the range of values of all state attributes. The state rules of a resource model are tailored for the real world resource they model. Thus, in the example of a particular piece of hardware, these rules define how the hardware (i.e. the resource) interacts with an operating system, what network connections are used by the resource, what programs run on the resource, etc. When a particular state attribute changes, a state rule that was satisfied under the prior state may no longer be satisfied, and vice-versa. This is referred to as a state change, and it results in an "event" 33 being emitted from the model. An event therefore is simply an announcement of a state change.

As an example of a state change (in the context described above), assume that the available disk space (the resource associated with the more primitive model) changes and drops below a certain threshold. Such event may then trigger a "state" change in the database server model (the resource associated with the composite model) indicating, for example, that the higher level resource may be unavailable. Of course, is is merely a representative example and should not be taken as limiting the scope of the present invention.

As noted above, the controls 36 are, in effect, the interfaces to a model that allow the underlying resource to be manipulated. For example, a model for a database server might include controls (accessible through an appropriate user interface) to modify the current security level of the system. Controls on a composite resource model may operate by calling on controls in component models. Returning again back to the database server model example, there may be a "cleanup" control on the database that shuts down a given operation at the server level. Execution of that control may then extend down to the more primitive level (in this example, the disk) to effect some necessary or ancillary function. This example is again merely illustrative. According to the preferred embodiment, the state rules may be augmented by instructions to call on selected controls when a state becomes satisfied or dissatisfied.

Mapping rules 38 preferably determine how a model hooks up to a real world resource. An actual mapping rule may be expressed in a high level manner by any convenient text, graphical or other format. Also, the manner in which the mapping rule gets carried out is not limited. Thus, for example, the rule may be effected through a database query that examines a database (that describes the machines in the network) and selects appropriate machines, e.g., using a lookup table technique. Yet another alternative is to use an agent-like piece of code (e.g., an applet) that dynamically gathers information at a particular machine by querying the machine to determine whether given characteristics meet some criteria defined by the mapping rule.

In a preferred embodiment, the mapping rules operate on a set of node identifiers defining a portion of the managed network over which the model is to be deployed. The rules determine for each node whether a model access point 35 should be established there for the particular resource model. A node identifier identifies a point on the network where a model can be deployed. An access point 35, then, is the interface established by a model when it is deployed on a node. Each access point established for a model corresponds to a single instance of the modeled resource.

When an access point 35 is created for a deployed resource model, canonical identifiers of the resource, the model, and the node are combined into an ordered tuple. The model registers this (resource, model, node) tuple in a globally-accessible registry. Another function of the mapping rules, therefore, is to determine whether the model has already been deployed for a given real resource.

Figure 5:
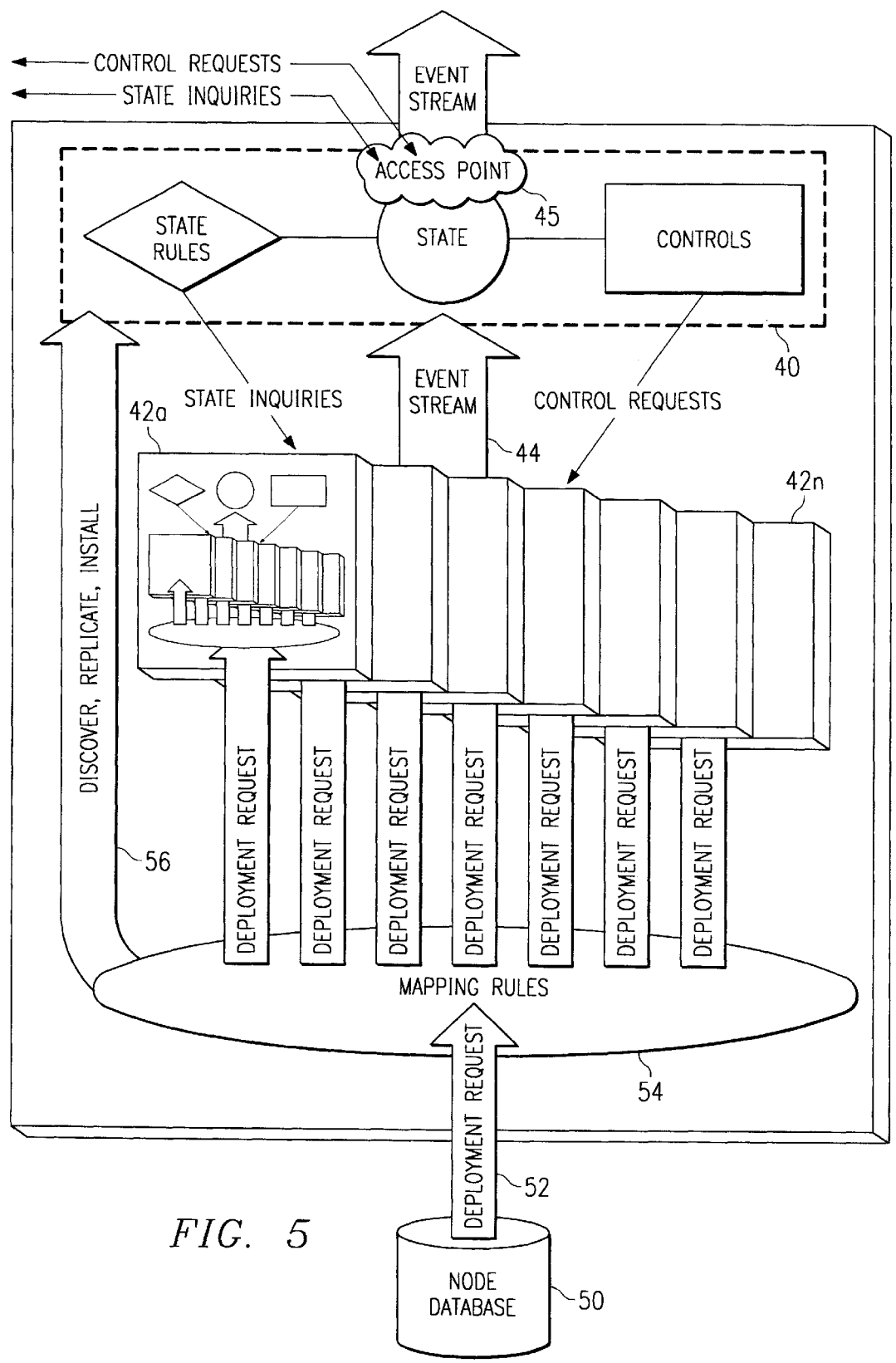
FIG. 5 is a block diagram illustrating how a "composite" resource model is associated with a subset of "primitive" resource models in the distributed computer network environment.

FIG. 5 illustrates a resource model 40 for a composite resource that has a plurality of "primitive" resource models 42a–42n associated therewith. As previously illustrated in FIG. 4, each resource model has its own set of properties including state, state rules, controls and mapping rules. The events from the primitive resource models are applied to the composite resource model via event stream 44. State inquiries 46 and control requests 48 are provided to the submodels 42 from the state rules and controls of the composite resource model. An access point 45 connects the composite resource to other resources in the network. The node database 50 preferably is associated with a managing server (e.g., server 14 or gateway 16 of FIG. 1). The database includes network configuration data describing the state of each resource, e.g., as defined by that resource's model. Information about the state of a given machine or component within the distributed computing environment may also be available or discoverable from other sources. When it is desired to deploy a given resource model, a deployment request 52 is supplied to the mapping rules 54 of the composite model, and these mapping rules provide the deployment request to each of the mapping rules associated with a given submodel 42. The particular mapping rules, as illustrated by the arrow 56, enable several functions or methods including discover, replicate and install. These methods are the work performed by the mapping rules.

The "discover" method identifies the particular state rules and controls that are present within the resource model. As used herein, the state rules and controls are sometimes referred to as an "automation". An automation, comprised of those state rules and controls, is preferably executable in a runtime environment installed on or associated with a given resource. Thus, in one representative implementation, an automation is a Java applet or application that is executed in a Java runtime environment of a browser running on an endpoint computer. The discover method may also be used to locate an access point for the resource model deployed to a given resource. The replicate method is used to make a copy of the resource model, and the install method is used to invoke the mapping rules and thus instantiate the automation in the local runtime environment.

Thus, as illustrated in FIG. 5, as resource models are deployed, a "web" is formed of composite models that depend on other models. The database 50 that links real resources, instances of models, and nodes, allows operators to find models of interest in order to observe the state of resources and to issue control requests. State change events that are dispatched by top-level composite models drive a "super model" that encompasses all managed resources in the network. Alternatively, composite models can be developed to support individual operators, so that particular resources are managed by particular administrators.

According to the present invention, resource models preferably are deployed into the distributed computer environment using a simple "drop-and-drag" protocol on the graphical user interface of a managing computer. As is well-known, a graphical user interface (GUI) comprises a number of common display elements such as windows, icons, menus and dialog boxes (which include dialog box options such as command buttons, text boxes, list boxes, drop-down list boxes, option buttons and check boxes). The present invention takes advantage of the existing GUI on a management computer. Familiarity with basic GUI operation is presumed in the following discussion.

Figure 6:
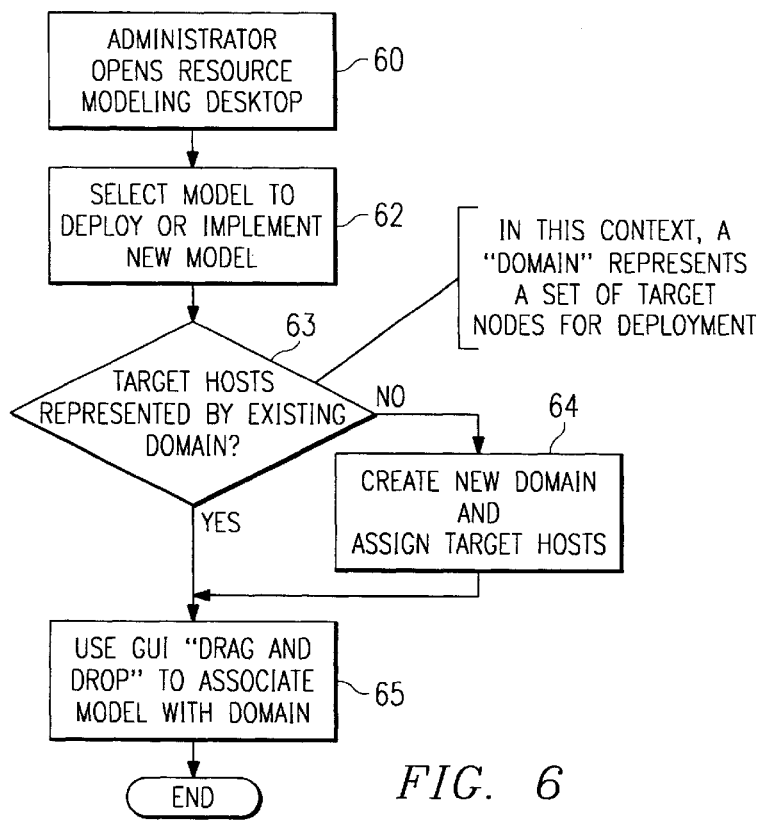
FIG. 6 is a flowchart of a preferred method of configuring and deploying a resource model.
Figure 7:
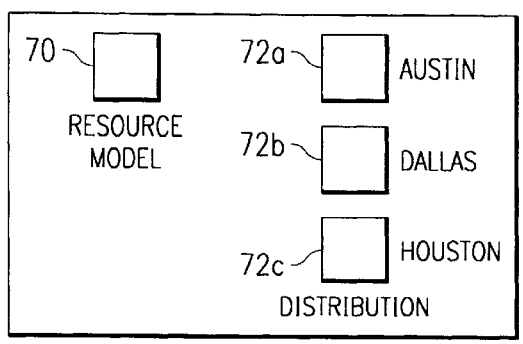
FIGS. 7–8 illustrates a preferred graphical user interface (GUI) on a central computer showing the "drag-and-drop" protocol of the invention for deploying a resource model.
Figure 8:
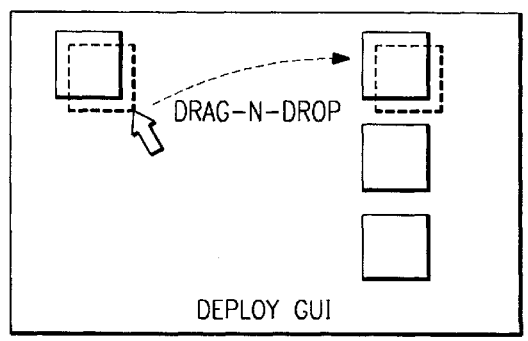
Figure 9:
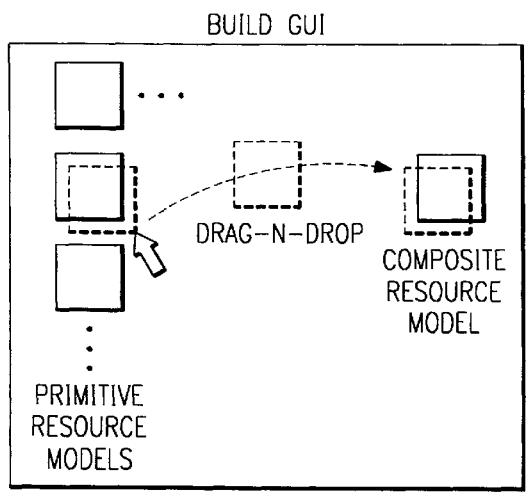
FIG. 9 is a GUI representation illustrating how a "drag-and-drop" technique is also useful in building a resource composite resource model using a plurality of primitive resource models.

FIG. 6 is a flowchart illustrating a preferred resource model configuration and deployment method implemented on a GUI of a computer. FIGS. 7–8 illustrate a representative GUI interface during the actual deployment process. FIG. 9 illustrates a representative GUI interface illustrating one preferred technique for building a composite resource model from a set of more primitive resource models using the drag-and-drop technique.

The configuration and method begins at step 60 by having an administrator open up a resource modeling desktop (e.g., a deployment task window on the GUI). At step 62, the administrator selects a resource model to be deployed or implements a new model (for example, through the build process illustrated below). Typically, step 62 requires the administrator to open up a dialog box and select an existing resource model. At step 63, a test is performed to determine whether the target hosts are represented by an existing domain. As used herein, a "domain" represents a set of target nodes for deployment). If the outcome of the test at step 63 is negative, the routine branches to step 64 to create a new domain and assign the target hosts to that domain. The routine then continues at step 65, which step is also reached by a positive outcome to the test at step 63. At step 65, the routine continues with the user applying a GUI drag-and-drop to associate the model with the domain.

The drag-and-drop technique is also useful in "building" a composite resource model from a set of one or more primitive resource models if the user desires to implement a new model. Typically, this involves the administrator opening up a dialog box and selecting the nature and/or type of resource model(s) needed. A set of primitive resource model icons may be displayed on the GUI, together with an icon representing the composite resource. The user preferably drags the primitive resource model icon on the composite resource model icon to instantiate the attributes of the primitive model into the composite model. As the primitive resource models are configured into the composite model, the underlying attribute sets change automatically to reflect the changing composite resource model.

During the building and/or deployment process, the administrator may initiate a discover operation to populate the GUI with the display elements. In this manner, the administrator may locate appropriate primitive resource models to be joined in the composite resource model, or to locate appropriate destination nodes for the resource modal to be deployed.

Thus, in the deployment situation, an icon representing the selected resource model and icons representing the distribution sets (which may have been located through the discovery process) are displayed on the GUI. This display is illustrated in FIG. 7. In this deployment example, the icon 70 represents the resource model (or the automation components thereof) and each distribution icon 72 represents a set of machines in the distributed environment. If desired, a distributed icon may have a bitmap associated therewith that provides a visual clue as to its characteristics. Thus, in a representative case, each distribution icon 72 represents a set of given machines in the distributed computer network, e.g., machines located in one geographic area of the distributed enterprise environment.

As previously described, the icon 70 representing the resource model is then associated with a selected one of the distributed icons 72, preferably via a drag-and-drop protocol. As illustrated in FIG. 8, a drag-and-drop protocol involves moving a graphical pointing device (e.g., a mouse) cursor over the icon 70, actuating a control button thereon (which attaches the cursor to the icon 70), dragging the icon 70 over, and then on top of the selected distribution icon 72, and then dropping the icon 70 onto the selected distributed icon 72. The drag-and-drop protocol uses local operating system resources in a known manner. This operation completes the deployment as far as the administrator is concerned. The above is merely illustrative, of course, as many display variants are within the scope of the invention. Thus, for example, more than one resource model (or automation icon) may be displayed at a time.

As noted above, the drag-and-drop protocol may also be used to "build" a resource model from a set of more primitive component resource models. FIG. 9 illustrates this process in a conventional GUI.

Figure 10:
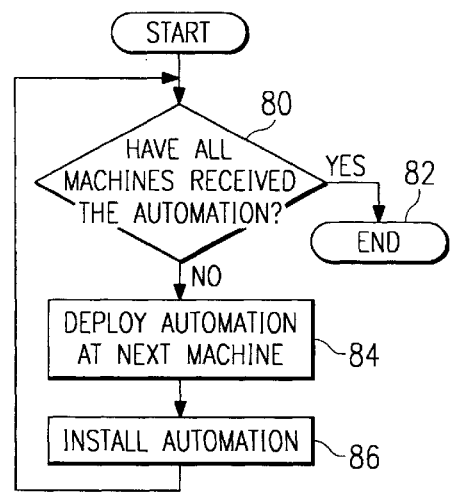
FIG. 10 is a flowchart illustrating how a resource model is instantiated onto a set of machines identified by a distribution icon.

FIG. 10 is a flowchart describing how the resource model (identified by icon 70) is deployed across the set of machines identified by the selected distribution icon 72. In this example, it is assumed that the set of machines are located in a given geographic region of the network (e.g., the computers located in Austin, Texas) and that each such computer includes a runtime environment for the automation components of the resource model. At step 80, a test is done to determine whether all of the machines have received the automation. If the outcome of the test at step 80 is positive, the routine branches to step 82 and ends. If, however, the outcome of the test at step 80 is negative, the routine continues at step 84 to deploy the automation at a next machine in the set of machines. At step 86, the automation is installed and executed by the runtime environment at the machine. Step 86 causes the semantics of the mapping rules to be invoked onto the actual physical resource (which, in this example, is the machine). This operation is done transparently to the administrator at the central computer and to the local user. The routine then returns to step 80. In one embodiment, the automation is a Java applet and the runtime is a JVM running as a local resource. It should be appreciated that the flowchart shown in FIG. 10 is merely illustrative, as the resource model instantiation typically occurs in parallel at each of the set of machines.

Figure 11:
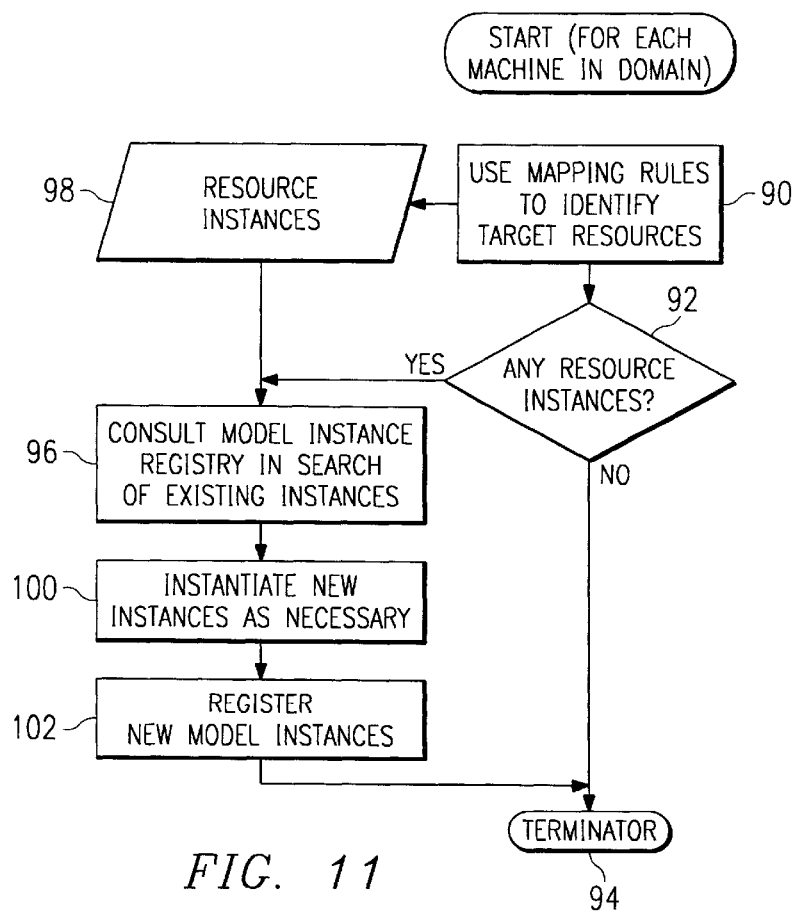
FIG. 11 is a flowchart illustrating a preferred instantiation routine at a particular machine.

FIG. 11 is a flowchart illustrating how the particular mapping rules are actually instantiated on a particular machine. As noted above, the routine is carried out on each machine that in the domain that is the subject of the deployment. It begins at step 90 by using the mapping rules to identify the target resources on the machine. At step 92, a test is done to determine whether any resource instances are required. If not, the routine terminates at step 94. If resource instances are required, the routine branches to step 96 to consult a model instance registry in search of existing instances. These resource instances are supported in the registry 98. The routine then continues at step 100 to instantiate new instances as necessary. Thereafter, the routine registers the new model instances at 102 and then terminates. This completes the processing.

One of ordinary skill will appreciate that the distribution icons describe a "coarse" level of management control (for a "set of machines") while the particular mapping rules in a resource model provide a "fine" level of management control over the particular resource on each machine. The drag-and-drop protocol provides a convenient and simple method of deploying such resource models. As has been described, deployment includes administrator selection of a particular distribution icon, and then instantiation of the resource model mapping rules at each machine in the set without further administrator or local machine involvement. One preferred technique for instantiating the resource model mapping rules uses the runtime environment at the receiving node.

Thus, in the example of FIG. 7, each of the distribution icons 72a–72c represents a given set of machines, in this case, the machines located in Austin, Dallas and Houston, respectively. One of ordinary skill will recognize, however, that sets of machines may be organized by other characteristics (and not merely by location). Generalizing, the type of distribution may be quite varied. Thus, for example, the resource model may be distributed to a given set of machines having a particular type of operating system, e.g., UNIX workstations, Windows NT workstations, OS/2 workstations, or the like, regardless of their location. In such scenario, there would be a distribution icon for each operating system type. In another alternative, the administrator may desire to distribute a particular model to a set of machines according to function, e.g., routers, security servers, file and print servers. In such case, there could be a distribution icon for routers, one for security servers, and so on. A still further alternative would be to deploy a given resource model to a certain class of user, e.g., system administrator, chip designer, etc., in which case, each distribution icon would be associated with a given user class. Combinations of such characteristics (e.g., Windows NT machines located in Austin, Texas) may also be used.

When each distribution icon is created, preferably "links" to the various machines are established and maintained in the node database 50. Thus, when the given resource model icon is dropped onto the distribution icon, the mapping rules of the resource model are instantiated "under the covers", namely, without direct administrator or local user involvement. The actual communication link may be established later by the distribution mechanism when a task is actually selected for distribution. The various machines which the distribution mechanism links with the distribution icon is based on the knowledge of the network topology and the characterization by the network administrator of the type of node which the icon represents. The network topology is preferably known either through the database created by system administration tasks or specialized discovery or a combination thereof.

One of ordinary skill in the art will appreciate that the graphical user interface (GUI) provides a convenient tool for manipulating the iconic representations that are useful in the inventive method. Thus, for example, different sets of icons may be easily presented to the user after the assembly process is concluded. One or more different pulldown menus with distribution icons may be used to choose the appropriate set of icons. Alternatively, a "next" push button might be presented in a window until the desired set is shown. Of course, the use of "icons" is also merely exemplary, as any convenient graphic representation (e.g., text, hypertext link, image, bitmap or the like) may be used as well.

As previously noted, mapping rules determine for each node whether a model access point should be established at that node. A node identifier identifies a point on the network where a model can be deployed. The resource model is then deployed preferably by dragging the resource model icon over to a distribution icon and then dropping it.

If desired, a discovery process may also be used to identify which nodes may constitute a given set of node identifiers for receipt of a resource model. As an example, consider a model for a primitive resource, such as temporary file space. A request is made to map the model to a set of nodes. According to the discovery process, the mapping rules will first identify those nodes that are machines with temporary file space. Then, for each such real resource discovered, the rules attempt to locate an access point for the model deployed to that unique resource. The rules then perform the deployment and access point registration on all nodes where the corresponding resource is "unmodeled".

For a composite resource, the rules will embody some criteria for selecting from a list certain nodes to host access points for real resources. The nodes chosen might correspond to some particular host-centric component resource, or they might correspond to a node suited for some other reason to hosting the access point. In any case, because a composite resource represents components that may be distributed across a number of nodes, one node must be chosen somehow to host the access point.

The principles of the present invention find particular utility in deploying resource models in a large distributed computer environment, but the techniques described are not limited to this application. Thus, the teachings may be generalized to cover the building and deployment of any model or similar construct in such an enterprise environment. Alternatively, the technique may be useful in building and deploying tasks within such as environment. In the latter example, the present invention thus contemplates building a task from a set of subtasks and then associating the task with a subset of network nodes (having some common characteristic) and preferably identified by a distribution icon on the graphical user interface. The task is then "installed" by the drag-and-drop technique previously described.

As discussed above, another advantage of the invention is the ability to build the composite "resource model" by selecting more primitive component models whose attributes are then combined "under the covers" by functional relationships to determine a set of attributes for the higher level model. Thus, in the disk server example referenced above, the administrator may browse to a library or other repository and select a "disk partition" resource model. This model would then be displayed on the GUI using an icon or the like. After the user selects all primitive resource models, each such primitive is selectively dragged and then dropped onto an icon representing the composite resource model to effect the build.

One of the preferred implementations of the invention is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, within the spirit and scope of the appended claims. Thus, for example, while a drag-and-drop protocol is the preferred technique for resource model deployment, this operation may be accomplished using other known input techniques, e.g., text entry, keystrokes, voice commands, and the like.

Having thus described our invention, what we claim as new and desire to secure by letters patent is set forth in the following claims:

What is claimed is:

1. A method of deploying a resource model in a distributed computer network using a computer having a graphical user interface, the resource model having associated therewith a set of one or more mapping rules for associating the resource model to a given resource, the method comprising the steps of:

displaying at least one distribution icon on the graphical user interface, the icon representing a subset of nodes in the distributed computer network;

associating the resource model with the distribution icon; and in response to the association, invoking the mapping rules associated with the resource model at each node in the subset.

2. The method as described in claim 1 wherein the step of associating the resource model to the distribution icon comprises:

displaying a resource model icon on the graphical user interface; and dragging and dropping the resource model icon onto the distribution icon.

3. The method as described in claim 1 wherein each node in the subset of nodes is associated with a machine in the distributed computer network.

4. The method as described in claim 1 further including the steps of:

discovering the subset of nodes; and associating the distribution icon with the discovered subset of nodes prior to displaying the distribution icon on the graphical user interface.

5. The method as described in claim 1 wherein the distributed computer network is organized into one or more managed regions, each region being managed by a management server servicing one or more gateway machines, with each gateway machine servicing a plurality of endpoint machines.

6. The method as described in claim 5 wherein the resource model defines a given resource in the distributed computer network.

7. The method as described in claim 6 wherein the given resource is selected from a set of resources consisting essentially of computer and communications hardware, operating system software, application programs and systems of programs that provide given services.

8. The method as described in claim 1 wherein the resource model comprises a curre nt state, a set of state rules, a set of controls and the mapping rules.

9. A method of deploying a resource model in a distributed computer network using a computer having a graphical user interface, the resource model having associated therewith a set of one or more mapping rules that associate the resource model to a given resource, comprising the steps of:

(a) displaying a set of distribution icons on the graphical user interface, each icon representing a set of given machines in the distributed computer network;

(b) dragging and dropping an icon representing the resource model onto a selected one of the distribution icons; and (c) in response to step (b), invoking the mapping rules associated with the resource model at each machine in the set.

10. The method as described in claim 9 further including the step of discovering at least one of the set of machines and associating the distribution icon with the discovered set of machines prior to displaying the distribution icon on the graphical user interface.

11. The method as described in claim 9 further including the step of modifying the set of di stribution icons displayed on the graphical user interface.

12. The method as described in claim 9 wherein the resource model defines a given resource in the distributed computer network.

13. The method as described in claim 12 wherein the given resource is selected from a set of resources consisting of computer and communications hardware, operating system software, application programs and systems of programs that provide given services.

14. The method as described in claim 12 wherein the resource model comprises a current state, a set of state rules, a set of controls and the mapping rules.

15. A method operative in a computer having a graphical user interface for managing a large, distributed computer network, comprising the steps of:

(a) discovering at least one set of machines having a resource associated therewith;

(b) displaying a distribution icon associated with the discovered set;

(c) dragging and dropping an icon representing a resource model onto the distribution icon; and (d) in response to step (c), directing instantiation of the resource model onto the set of machines.

16. The method as described in claim 15 wherein the resource model comprises a set of state rules, a set of controls and a set of mapping rules.

17. The method as described in claim 16 wherein the step of instantiating the resource model comprises invoking the set of mapping rules on each of the set of machines.

18. In a large distributed enterprise having a management server servicing a set of gateway machines, each of which services a set of endpoint machines, a resource model deployment method comprising the steps of:

(a) displaying a distribution icon associated with a set of endpoint machines;

(c) associating an icon representing a resource model with the distribution icon; and (d) in response to step (c), instantiating the resource model onto the set of endpoint machines.

19. A computer for use in managing a large distributed computer enterprise, comprising:

a processor;

an operating system;

a graphical user interface; and resource model deployment means, comprising:

(a) means for discovering at least one set of machines having a resource associated therewith;

(b) means for associating the discovered set of machines with a distribution icon; and (c) means responsive to dragging and dropping an icon representing a resource model onto the distribution icon for instantiating the resource model onto the set of machines.

20. A computer program product in computer-readable media for use in a computer having a processor, an operating system, a graphical user interface, and means for connecting the computer into a large distributed enterprise, the computer program product comprising:

(a) means for discovering at least one set of machines having a resource associated therewith;

(b) means for associating the discovered set of machines with a distribution icon; and (c) means responsive to dragging and dropping an icon representing a resource model onto the distribution icon for instantiating the resource model onto the set of machines.

* * * * *